United States Patent [19]

Hicks et al.

[11] Patent Number: 5,179,981
[45] Date of Patent: Jan. 19, 1993

[54] FAULT DETECTION METHOD FOR CENTRAL TIRE INFLATION SYSTEM

[75] Inventors: Bradford W. Hicks, Kalamazoo; Brian R. Blust, Rochester; James A. Beverly; Gary R. Schultz, both of Kalamazoo, all of Mich.

[73] Assignee: Eaton Corporation, Cleveland, Ohio

[21] Appl. No.: 828,636

[22] Filed: Mar. 12, 1992

Related U.S. Application Data

[60] Division of Ser. No. 483,341, Feb. 20, 1990, Pat. No. 5,121,774, which is a continuation of Ser. No. 198,530, May 25, 1988, abandoned.

[51] Int. Cl.$^5$ .................................................. B60C 23/16
[52] U.S. Cl. ........................................ 141/4; 141/1; 141/38; 141/95; 152/415; 340/441; 340/442; 340/444; 364/424.01; 364/558
[58] Field of Search ................. 141/4, 38, 95, 1; 152/415–417; 340/441, 442, 444; 73/146–146.5; 364/424.01, 424.05, 426.04, 558; 303/DIG. 3, DIG. 4; 137/224, 227–229

[56] References Cited

U.S. PATENT DOCUMENTS

| | | | |
|---|---|---|---|
| 3,102,573 | 9/1963 | Van Winsen et al. | 152/416 |
| 3,276,503 | 10/1966 | Kilmarx | 152/417 |
| 4,020,456 | 4/1977 | Nozi | 340/441 X |
| 4,064,482 | 12/1977 | Maisch et al. | 340/444 |
| 4,316,176 | 2/1982 | Gee et al. | 73/146.5 X |
| 4,418,737 | 12/1983 | Goodell et al. | 152/416 |
| 4,640,331 | 2/1987 | Braun et al. | 152/417 |
| 4,658,943 | 4/1987 | Nishikawa et al. | 364/424.05 X |
| 4,702,843 | 10/1987 | Oswald et al. | 280/707 |
| 4,744,399 | 5/1988 | Magnuson et al. | 152/417 |

FOREIGN PATENT DOCUMENTS

| | | | |
|---|---|---|---|
| 0344004 | 11/1989 | European Pat. Off. | 340/444 |
| 0368365 | 5/1990 | European Pat. Off. | 340/442 |
| 1046143 | 10/1983 | U.S.S.R. | 303/DIG. 4 |
| 2226092 | 6/1990 | United Kingdom | 364/424.1 |

Primary Examiner—Charles E. Phillips
Assistant Examiner—Casey Jacyna
Attorney, Agent, or Firm—H. D. Gordon

[57] ABSTRACT

A self-diagnostic method for an on-board CTIS (10) for sensing system faults and/or vehicle conditions requiring system shut down. Includes a method for preventing operations of the CITS if the pressure in the air tank has not reached a desired minimum when the vehicle speed exceeds a reference speed for a preselected period of time.

6 Claims, 3 Drawing Sheets

FAULT DETECTION METHOD FOR CENTRAL TIRE INFLATION SYSTEM

This application is a division, of application Ser. No. 483,341, fled Feb. 20, 1990 now Pat. No. 5,121,774, which is a continuation of Ser. No. 198,530, May 25, 1988, now abandoned.

BACKGROUND OF THE INVENTION

1. Field of the Invention

The present invention relates to a method for detecting system faults in an on-board central tire inflation system of the type having a plurality of inflatable tires each fluidly communicatable individually or as a group or groups by branch conduit means to a common central conduit which may be otherwise fluidly isolated or connectable to a source of pressurized fluid or to an exhaust to atmosphere and having pressure measurement means for measuring a pressure value indicative of the inflation pressurization of the central conduit. Preferably, each of the tires will have a wheel-end valve for selectively establishing or blocking fluid communication between the tire and the common central conduit.

2. Description of the Prior Art

Central tire inflation systems ("CTIS"), also known as tire traction systems, are well known in the prior art as may be seen by reference to U.S. Pat. Nos. 2,634,782; 2,976,906; 2,989,999; 3,099,309; 3,102,573; 3,276,502; 3,276,503; 4,313,483; 4,418,737; 4,421,151; 4,434,833; 4,640,331 and 4,678,017, the disclosures of all of which are hereby incorporated by reference. CTIS allow the operator to remotely manually and/or automatically vary and/or maintain the inflation pressure of one or more of the vehicle tires from the vehicle (usually a truck) air system, usually while the vehicle is in motion as well as when the vehicle is at rest.

It is well known that the traction of vehicles on relatively soft terrain (i.e. on mud, sand or snow) may be greatly improved by decreasing the inflation pressure within the tires. By decreasing the inflation pressure, the tire supporting surface (usually called the "footprint") will increase thereby enlarging the contact area between the tires and the terrain. Additionally, it is often desirable to decrease the tire pressure from the over-the-road or highway inflation pressure to increase riding comfort on rough roads. On the other hand, higher tire pressures decrease rolling resistance and tire carcass temperatures on smooth roads thereby increasing economy and safety. Accordingly, in cross country vehicles it is desirable to change the inflation pressure in the pneumatic tires to fit the terrain and is also desirable that a system be provided for changing the inflation pressure of the tires from an on-board source, while the vehicle is at motion or at rest and that the system be controlled from the vehicle's operating cab.

In a particular type of CTIS, as illustrated and described in above-mentioned U.S. Pat. No. 4,640,331, a plurality of wheel ends (each comprising one or more tires) are each, individually or as a group or groups, fluidly connectable by a separate branch conduit to common central conduit which may be connected to a source of pressurized air for inflating the tires, to a source of regulated pressurized air for deflating the tires and/or, to atmosphere for venting the conduits and relieving pressure across the rotating seals. The common conduit may also be pressurized by means of a quick release valve or the like to the average pressure of selected ones of the various branch conduits. A single pressure transducer is provided in fluid communication with the common central a value indicative of the pressure or average passage in selected ones or groups of the inflatable tires.

The CTIS source of pressurized fluid is, preferably, the on-board air system comprising a brake wet tank supplied by an engine driven compressor. The wet tank is provided with a two-position pressure switch which will automatically open to block fluid communication between the wet tank and CTIS if wet tank pressure falls below a minimal pressure (i.e. almost 80 psia) required for safe brake system operation and will automatically close when the tank pressure achieves a safe value (i.e. about 115 psia) for diverting pressurized air from the brake system to the CTIS. The switch is preferably provided with means to provide output signals indicative of the open or closed condition of the wet tank pressure switch.

While the on-board CTIS described above is highly advantageous as pressure venting is remote from the wheel ends, the conduits and seals are vented to atmosphere during system inactive (steady state) conditions and a single pressure transducer, located in a relatively well protected location remote from the wheel ends and/or the vehicle under carriage, can be utilized to sense tire inflation of the vehicle tires or groups of tires, the CTIS was not totally satisfactory as methods for detecting, on a self-diagnostic basis, conditions indicative of certain system faults and/or vehicle conditions requiring CTIS shutdown, were not provided.

SUMMARY OF THE INVENTION

In accordance with the present invention, the drawbacks of the prior art are minimized by the provision of a CTIS control self-diagnostic method for detecting conditions indicative of system faults and/or vehicle conditions which require CTIS shutdown (i.e. prohibition of further CTIS operation until corrective action is taken).

The above is accomplished by conducting a variety of self-diagnostic tests such as reading the pressure transducer when the main conduit is vented to atmosphere to determine if the transducer is generating impossible output signals, sensing initial tire pressure for a reading so low as to indicate a faulty pressure transducer or a catastrophic failure in the tires, seals and/or conduits, sensing failure of the wet tank switch to close under conditions sufficient to recharge the wet tank which indicates a compressor, tank or switch failure and/or sensing a trend of decreasing tire pressure during an inflation operation which indicates that leakage rates exceed inflation rates.

Upon detection of such a system fault or vehicle condition, the CTIS controller, preferably microprocessor based, will signal the vehicle operator of the condition and shutdown (i.e. close wheel end valves and discontinue all further pressure sensing/adjusting operation) the CTIS system. Preferably, the vehicle operator will not be allowed to override the shutdown of the CTIS system.

Accordingly, it is an object of the present invention to provide a new and improved control method for an on-board central tire inflation system including self-diagnostic fault detection methods.

This and other objects and advantages of the present invention will become apparent from a reading of the following description of the preferred embodiments taken in connection with the attached drawings.

DESCRIPTION OF THE PREFERRED EMBODIMENT

Figure 1:
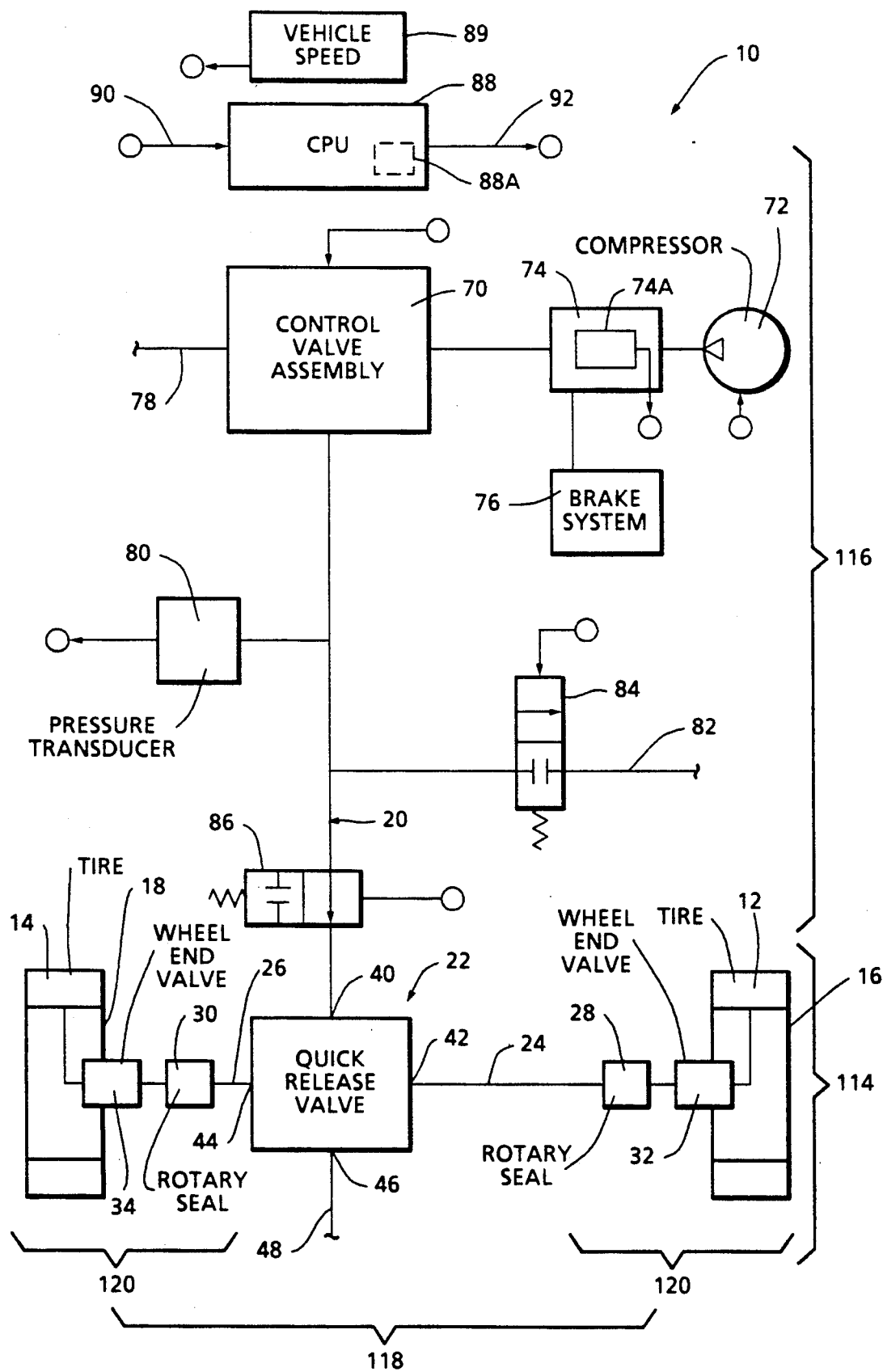
FIG. 1 is a schematic illustration of the pneumatic and electronic components of the present invention as utilized to control the inflation of groups of tires.

In the following description of the present invention, certain terms will be utilized for purposes of reference only and are not intended to be limiting. The terms "upward", "downward", "rightward" and "leftward" refer to direction in the drawings to which reference is made. The terms "inward", and "outward", respectively, refer to directions towards and away from, respectively, the geometric center of the device described. The terms "inflation" and "deflation", respectively, refer to increased and decreased, respectively, pressurization of a tire or the like. Said terminology will include the words above specifically mentioned, derivatives thereof and words of similar import.

The advantages of varying the inflation pressure of the pneumatic tires (especially the driven tires) of a vehicle, especially a relatively heavy duty vehicle, in accordance with the terrain over which the vehicle is traveling are well known in the prior art and may be appreciated by reference to above-mentioned U.S. Pat. No. 4,640,331. Assuming, for example, the vehicle rear drive axle tires are normally inflated to about about 75 psi (pounds per square inch) for highway operation, decreasing the tire inflation pressure to be 35 psi for cross country travel over rough road or to about 20-25 psi for operation in sand, mud or snow conditions or to about 10-12 psi for severe emergency conditions, will result in the tire having a greater contact area (i.e. footprint), and improved traction. In addition to improved traction at lower tire inflation pressure, the vehicle will be able to maintain a higher speed over poor ground, and reduce wear and tear on the vehicle, because of the smoother ride over "washboard" type terrain. Conversely, to reduce operating temperature and wear and tear on the tires at highway speed, a higher tire inflation pressure is desired. Of course, to increase mobility, it is highly desirable that the tire inflation pressures be controllable from the vehicle cab from an on-board source of pressurized fluid and be variable and maintainable with the vehicle in motion as well as when the vehicle is at rest.

In an on-board CTIS wherein the pressurization of the vehicle tires is altered in accordance with the vehicle operators selections, and is automatically maintained at the selected pressure, it is important to have a self-diagnostic fault detection method to assure that certain faults/vehicle conditions which require system shutdown are tested for, and, if sensed, that the operator is notified of such faults/conditions and the CTIS is shut down.

This will assure that tire inflation conditions are not made less desirable by operator attempts to modify pressure or by an automatic periodic system pressure check/correction procedure.

The CTIS self-diagnostic control method of the present invention is especially well suited for the type of CTIS 10 schematically illustrated in FIG. 1 and disclosed in above-mentioned U.S. Pat. No. 4,640,331. CTIS 10 measures and controls the inflation pressure of the interior pressurized chambers 12 and 14, respectively, of a group of tires 16 and 18, respectively, by selectively causing the chambers to fluidly communicate with a common conduit 20, the pressurization of which conduit may be selectively increased, decreased, vented to atmospheric and/or measured. Tires 16 and 18 are typically grouped for this purpose as carried by an axle or set of axles and being of the same ideal inflation pressurization for various operating conditions.

Each of the inflatable chambers 12 and 14 of tires 16 and 18 are fluidly connected to a common quick release valve 22 by means of a branch fluid passage, 24 and 26, respectively. The fluid passages each include a rotary seal assembly, 28 and 30, and a wheel-end valve assembly, 32 and 34. The rotary seal assemblies may be of any construction, such as seen in U.S. Pat. No. 4,434, 833, the disclosure of which is incorporated by reference.

The wheel end valves 32 and 34 are normally closed to block fluid communication between the tire chambers and the quick release valve 22 and are effective to be selectively opened to fluidly communicate the tire chambers and ports 42 and 44 of valve 22. Wheel end valves 32 and 34 are preferably controlled by pressurization/evacuation in the conduits 24 and 26 and are opened or closed as a group. Wheel end valves 32 and 34 may be of the structures illustrated in above-mentioned U.S. Pat. Nos. 4,640,331 and 4,678,017.

Figure 2:
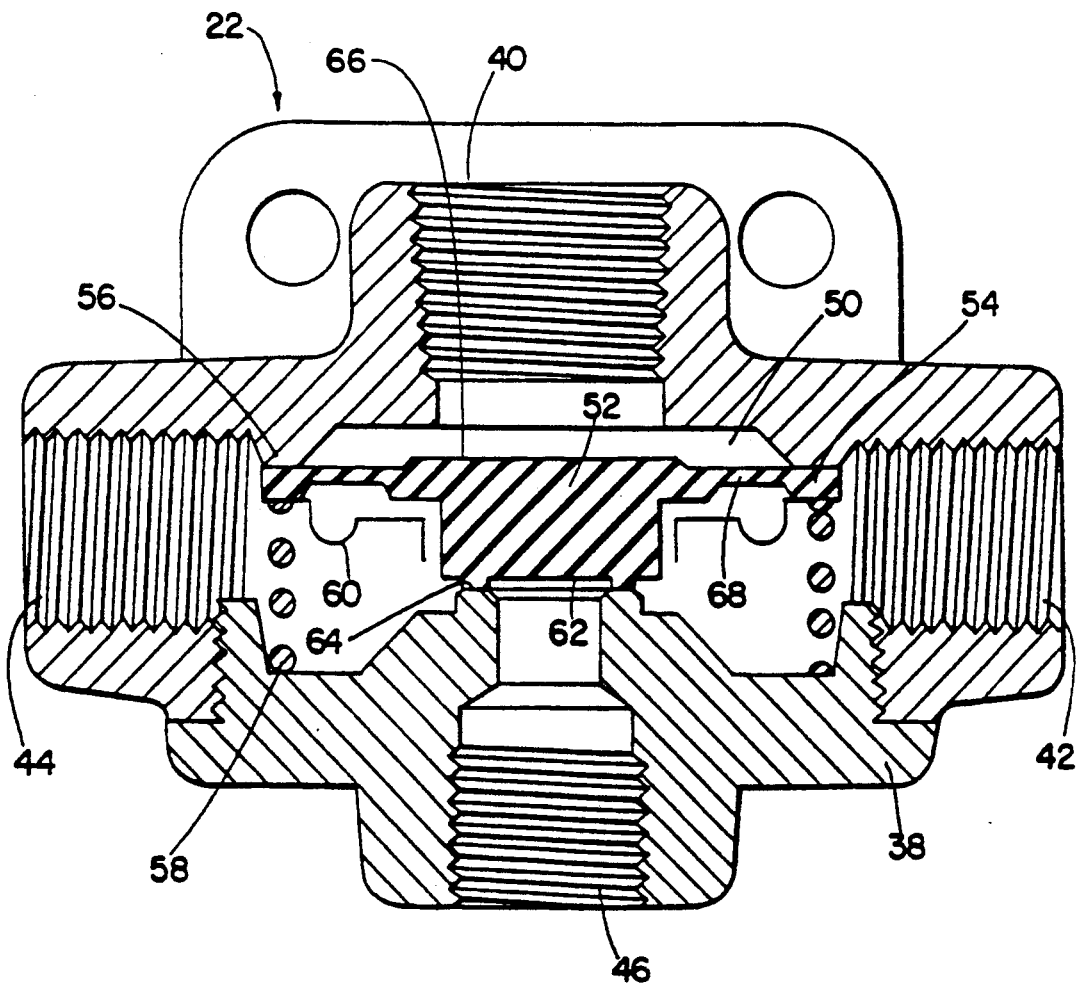
FIG. 2 is a section view of the quick release valve schematically illustrated in FIG. 1.

The structure and operational function of quick release valve 22 may be seen in greater detail by reference to FIG. 2. Valve 22 includes a valve body 38 defining a first port 40 connected to common conduit 20, a second port 42 connected to passage 24, a third port 44 connected to passage 26 and a fourth port 46 connected to a vent passage 48 to atmosphere. The valve body 38 defines a central cavity 50 in which diaphragm is received.

The outer periphery 54 of diaphragm 52 cooperates with an annular valve seat 56 to control the flow of fluid between port 40 and the fluidly communicating ports 42 and 44. A spring 58 and spring retainer 60 may be utilized to bias the outer periphery 54 into sealing contact with the valve seat 56. The diaphragm portion 62 cooperates with an annular valve seat 64 at port 46 to control the flow of fluid between ports 46 and the fluidly communicating ports 42 and 44. Diaphragm portion 62 is biased into sealing engagement with valve seat 64 by means of fluid pressure in conduit 20 acting on upper surface 66. The average pressure in Passages 24 and 26 act upon the undersurface 68 of the diaphragm.

The operational characteristics of quick-release valve 22 are that a fluid flow (i.e. flow of higher pressurized fluid to a conduit or chamber at a lower pressurization) may be maintained from port 40 to ports 42 and 44. However, a fluid flow may not be maintained from ports 42 and 44 to port 40 as diaphragm 52 will lift to open ports 42 and 44 to the exhaust port 46. Further, the valve 22, by establishing fluid communication from port 40 to ports 42 and 44, and from the pressure of conduits 20, 24 and 26, ports 42 and 44 (conduits 24 and 26) to exhaust port 46, is effective to equalize at the pressurization of the lower pressurized of conduit 20 or average pressure of conduits 24 and 26.

It is important to note that quick-release valve 22 through which the various valves at the wheel end assemblies are vented, is located remote from the wheel end assembly and may also be located remotely from the control valve and pressure transducer to be described below.

If a pressure differential exists between tires 16 and 18, when the wheel end valves are opened and the conduit 20 is sealed, the pressure in conduit 20 will initially be the higher of the tire pressures and will decrease to an average of the tire pressures as the tires cross-breath.

A control valve assembly 70 is connected to a source of pressurized fluid, such as on-board compressor 72. Typically, compressor 72 will communicate with a vehicle air brake wet tank 74 which will supply the air brake system 76 with a higher priority than the CTIS control valve assembly 70. The control valve assembly is also connected to a vent passage 78 to atmosphere and to the central conduit 20.

The control valve assembly is effective to selectively vent conduit 20 to atmosphere and as a result to vent passages 24 and 26 through port 46 of Quick Release valve 22, to pressurize conduit 20 to a relatively high pressure for inflation of the tires, to pressurize conduit 20 to a relatively low pressure to deflate the tires or to pulse conduit 20 with a high pressure to allow conduit 20 to stabilize at the average pressure in the tire chambers. Preferably, if wheel end valves similar to those disclosed in above-mentioned U.S. Pat. Nos. 4,640,331 or 4,678,017 are utilized, pressurization and venting of conduit 20 is also effective to open and close, respectively, the wheel end valves.

A pressure transducer 80 is provided for sensing the pressurization of conduit 20 and for providing an output signal indicative thereof. To obtain an accurate measurement of average tire pressure, wheel end valves 32 and 34 must be opened and conduit 20 must be sealed at control valve assembly 70 to allow the pressure in conduit 20 to attempt to stabilize at average tire pressure.

A second central conduit branch 82 and a pair of two-way/two-position valves 84 and 86 may be provided to allow the control valves assembly 70 and transducer 80 to be utilized to measure and control a different set of tires.

A central processing unit (CPU) 88, preferably microprocessor based, may be provided for controlling system 10. CPU 88 includes conditioning circuits 90 for receiving input signals, such as signals from pressure transducer 80, conditioning circuits 92 for issuing command output signals and logic (hardware or software) for defining logic rules by which the input signals are processed to generate command output signals. CPUs of microprocessor based type are well known in the prior art, as may be seen by reference to U.S. Pat. No. 4,595,986, the disclosure of which is incorporated by reference.

The wet tank 74 is preferably provided with a two-position pressure switch 74A having a first (open) and second (closed) position and means to provide an output signal to the CPU indicative of the current position thereof. Switch 74A is provided with a large hysteresis band and, if closed, will open if pressure in wet tank 74 drops to below about 80 psi and, if open, will closed if pressure in wet tank 74 is greater than about 115 psi. When switch 74A provides an "open" signal to CPU 88, CPU 88 will not allow the wet tank 74 to communicate with the CTIS control valve assembly 70. Two-position pressure switches of this type are commercially available from multiple sources, such as for example, the ZOPS series from Klixon Control Products Division Texas Instruments.

Preferably, CPU 88 will receive input signals from a vehicle speed sensor 89 and will be provided with a timer 88A.

At system start-up, or prior to and/or in connection with system operations, it is desirable to have a system diagnostic routine or method to test for system faults and/or vehicle conditions which may require disabling the system until the condition is repaired. To accomplish this, the CTIS control method of the present invention includes self-diagnostic routines.

During system steady state conditions, the conduits 20, 24 and 26 are vented to atmosphere to protect the seals. At this condition, prior to any tire pressure measurement operation, the pressure reading from transducer 80 is compared to an acceptable band, for example 8.0 psia-to-16.5 psia, corresponding to the lowest and highest expected atmosphere pressures at the highest and lowest points altitudes, respectively, at which the CTIS will operate.

If the output signals from the pressure transducer do not fall within the expected acceptable range of values, a faulty pressure transducer is indicated and the CTIS is shutdown.

At system start-up, and prior to any pressure adjustment, initial tire pressure is measured and compared to a predetermined minimum reference value (5 psig), and, if less than the reference value, a system fault (faulty pressure transducer) and/or a catastrophic vehicle condition (damaged tires, seals and/or conduits) is indicated and the CTIS is shutdown.

During normal conditions, after the pressure switch 74A opens, if the vehicle operates at least a given speed (about 20 mph) for a given period of time (4 minutes), the compressor should recharge the wet tank 74 sufficiently to cause switch 74A to close. Accordingly, upon opening of switch 74A, a timer 88A times the period of vehicle operation over a reference speed. If the switch 74A does not close during the preselected time period, a system fault (faulty pressure switch 74A) and/or unacceptable vehicle condition (faulty compressor 72, etc.) is indicated and the system is shut down.

During an inflation operation, the wet tank is cycled between a build-up in pressure phase to about 115 psia to close the pressure switch 74A, and an inflation phase as the wet tank is opened until its pressure drops to about 80 psia causing the opening of pressure switch A. During the pressure buildup phases, the pressure in the tires is measured and memorized. If the tire pressure over a plurality of cycles shows a downward trend, a leakage condition having a leakage rate exceeding the CTIS inflation rate is indicated and the CTIS is shut down.

Figure 3:
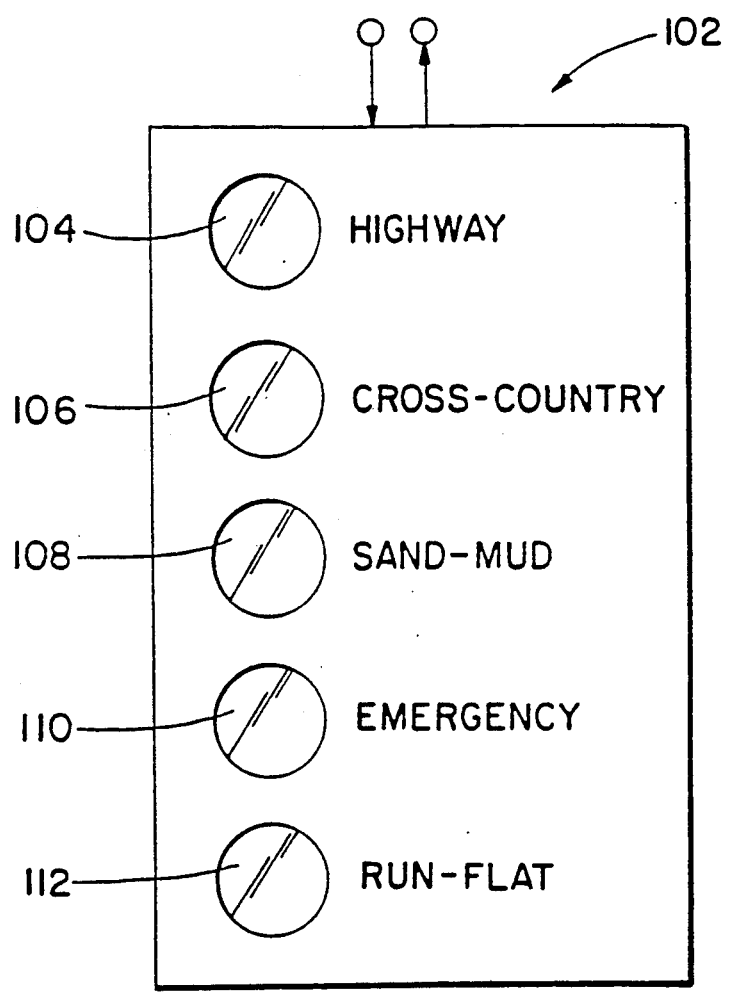
FIG. 3 is a schematic illustration of an operator's control panel.

In one embodiment of CTIS 10, the vehicle operator is provided with a control panel 102, see FIG. 3, having five illuminatable buttons, 104, 106, 108, 110 and 112, by which a desired tire pressurization may be selected. If the self-diagnostic method senses conditions indicative of a system fault or vehicle conditions requiring CTIS shut down, buttons 104, 106, 108, 110 and 112 will be illuminated and/or flashed to inform the operator of the unacceptable condition and the CTIS will be shut down.

As may be seen by reference to FIG. 1, CTIS includes an at-axle portion or portions 114 and a remote portion 116 which may be located anywhere on the vehicle, preferably at a relatively protected location. Further, the at-axle portions 114 of system 10 comprise a stationary portion 118 and rotating portions 120.

Although the preferred embodiments of the present invention have been described with a certain degree of particularity, it is understood, of course, that certain substitutions for and rearrangement of the parts or steps may be resorted to without departing of the spirit and the scope of the present invention as hereinafter claimed.

We claim:

1. A diagnostic method for sensing unacceptable operating conditions in an on-board CTIS of the type comprising a control valve assembly (70) for selectively pressurizing and venting a controlled fluid conduit (20), a tank (74) for accumulating pressurized air, means for selectively fluidly connecting and isolating said control valve assembly and said tank which is a two-position pressure switch means (74A) communicating with the pressurized interior of said tank and movable from a first position (open) to a second position (closed) if the pressurization in said tank exceeds a first reference value and movable from said second position to a first position if the pressurization in said tank is less than a second reference value, said first reference value being greater than said second reference value, said pressure switch means generating a signal indicative of the position thereof, means for sensing vehicle speed and generating a signal indicative thereof, and control means for receiving input signals and processing said input signals to generate command output signals, said control means effective to generate command output signals prohibiting fluid communication between said tank and said control valve upon receiving an input signal indicating said pressure switch is in the first position thereof, said method characterized by:

sensing the position of said two-position pressure switch:

sensing the speed of the vehicle;

if said two-position pressure switch remains in the first position thereof for at least a preselected period of time while vehicle speed exceeds a reference speed, preventing further operation of the CTIS.

2. The method of claim 1 wherein said tank is an air brake wet tank fluidly connected to the vehicle air brake system.

3. The method of claim 1 wherein said tank is fluidly connected to an on-board air compressor, the output of which compressor is directly related to the speed of the vehicle.

4. The method of claim 1 wherein aid second reference pressure is the minimum acceptable pressure for operation of said air brake system.

5. The method of claim 1 wherein said control means includes a digital microprocessor.

6. The method of claim 1 wherein said tank is fluidly connected to an on-board air compressor, and said second reference pressure is the minimum acceptable pressure for operation of said air brake system.

* * * * *